United States Patent

[11] 3,609,056

| [72] | Inventor | Everett D. Hougen<br>6956 N. Odell Ave., Chicago, Ill. 60634 |
|---|---|---|
| [21] | Appl. No. | 830,650 |
| [22] | Filed | June 5, 1969 |
| [45] | Patented | Sept. 28, 1971 |

[54] HOLE CUTTER
29 Claims, 19 Drawing Figs.

[52] U.S. Cl. .................................................. 408/204,
143/85 A, 145/119
[51] Int. Cl. ............................................. B23b 51/04
[50] Field of Search .......................................... 77/69, 68;
143/85 (1); 145/119, 120

[56] References Cited
UNITED STATES PATENTS
2,062,257  11/1936  Douglas et al. ............... 143/(85-1)
2,444,099  6/1948  Hennessey .................. 77/69

FOREIGN PATENTS
106,808  11/1899  Germany ..................... 77/69

Primary Examiner—Francis S. Husar
Attorney—Barnes, Kisselle, Raisch & Choate

ABSTRACT: An annular hole cutter having a relatively thin, cylindrical sidewall with a plurality of teeth formed in the thickened lower edge thereof. The teeth have cutting edges extending across the full width of the thickened edge. The cutting edges have two radially inclined portions which intersect in a crest so as to cut a V-shaped groove. An upwardly and radially outwardly inclined gullet is formed between successive teeth, the gullet opening at its upper end into an annular chip clearance space in the groove above the thickened edge of the sidewall.

INVENTOR.
EVERETT D. HOUGEN
BY
Barnes, Kisselle, Raisch & Choate.
ATTORNEYS

INVENTOR.
EVERETT D. HOUGEN

INVENTOR.
EVERETT D. HOUGEN
BY
Barnes, Kisselle, Raisch & Choate
ATTORNEYS

HOLE CUTTER

This invention relates to the annular hole cutters of the type having a relatively thin, generally cylindrical wall formed as a shell or blade with a plurality of axially extending teeth at one or both ends thereof.

An annular hole cutter of the type to which the present invention relates is similar in some respects to a conventional hole saw in that it forms a hole by cutting a circular groove in the workpiece so that the central portion of the hole being formed is in the form of a cylindrical slug as distinguished from a conventional drill or milling cutter, the cutting edges of which are designed to cut and remove the workpiece material throughput the cross section of the hole being cut. The annular cutter of the present invention is also distinguishable from such types of rotary cutters as hollow ground milling cutters, the latter having a wall thickness on the order of 0.125 inch or more, whereas an annular hole cutter of the type to which the present invention relates, like a conventional hole saw, has a wall thickness of less than about 0.060 inch for a diameter up to about 6 inches.

Presently utilized hole cutters require relatively high driving loads and axial feed loads to perform the cutting function. Hole cutters as conventionally constructed suffer from relatively rapid wear of the cutting edges which results in a poor surface finish of the sidewall of the hole cutter being cut as well as its accuracy and require frequent replacement or resharpening of the cutting edges. Breakage and chipping of the cutting edges is also a constant problem with conventionally formed hole cutters.

The primary object of the present invention is to provide an annular type hole cutter of the type described which enables cutting holes with a reamedlike sidewall finish, with a minimal breakthrough burr and at rates far in excess of those which are obtainable with currently available cutters (such as twist drills, milling cutters, hole saws, and the like), which has a substantially longer tool life, and which can be manufactured at relatively low cost without sacrificing surface quality and dimensional accuracy of the holes to be cut.

More specifically, the present invention has for its objects to provide a hole cutter:

a. which permits a smooth continuous cut with a high rate of material removal and exceptional accuracy;

b. which requires relatively low cutting torque and exceptionally low feed loads;

c. which produces efficient and continuous chip removal from adjacent the cutting edges of the tool to the exterior surfaces of the workpieces;

d. which is designed to promote heat dissipation from the cutting edges;

e. which is capable of initiating the cutting cycle in a workpiece in a minimum of time and with a minimum of hole location error;

f. which is capable of cutting holes in materials which are extremely susceptible to work hardening;

g. which is capable of initiating penetration of the workpiece with a minimum of deflection of the workpiece and tool; and h. which promotes free flow of coolant into close proximity of the cutting edges and in the same direction as chip flow.

Other features and advantages of the hole cutter of the present invention will be apparent from the accompanying description and drawings in which.

Figures 1, 2:
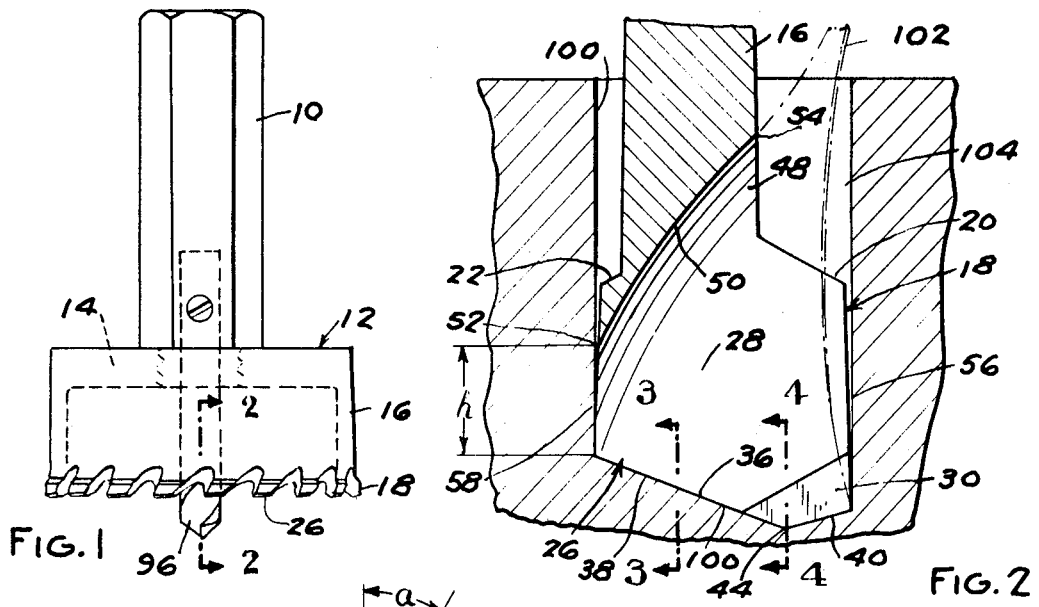
FIG. 1 is a side elevational view of an annular hole cutter according to the present invention.
FIG. 2 is a fragmentary sectional view of the cutter taken along line 2—2 in FIG. 1 and illustrating the cutting of a hole therewith.

Referring first to the form of cutter shown in FIGS. 1 through 7, the cutter there illustrated includes an arbor 10 adapted to be engaged in the chuck of a drill or the like and having a cup member 12 suitably mounted at one end thereof. Cup 12 has an end wall 14 and a relatively thin sidewall 16. Adjacent its lower end sidewall 16 is radially thickened as at 18, the thickened portion as shown in FIG. 2 extending radially outwardly beyond the thinner portion of the wall 16 as indicated by shoulder 20 and also extending radially inwardly beyond the thinner sidewall portion as indicated by shoulder 22. Thickened edge 18 can be formed in any manner desired, such as machining, grinding, rolling, swaging or even welding separate metal strips around the inner and outer peripheries of wall 16. In a typical cutter constructed in accordance with the present invention and designed to cut holes having a diameter up to about 6 inches, sidewall 16 at its thinner portion would have a thickness in the range of 0.040 inch to 0.45 inch, the portion 20 extending radially outwardly to an extent of about 0.025 inch to 0.030 inch and the portion 22 extending radially inwardly to an extent of about 0.005 inch to 0.015 inch so that the thickened edge 18 would have a thickness of about 0.070 inch to 0.090 inch.

The thickened portion 18 of sidewall 16 is formed with a plurality of cutting teeth 26 around the periphery thereof, seven or more teeth per inch, for example. The configuration of each cutting tooth is shown in detail in FIGS. 2 through 6. Each cutting tooth has a front face comprised of at least two portions 28 and 30. Face portion 28 will be hereinafter referred to as the primary rake surface and portion 30 will be referred to as the secondary rake surface. Each tooth is also provided with a bottom surface comprised of at least two portions, the portion 32 which will be referred to as the primary back off surface and the portion 34 which will be referred to as the secondary back off surface. The cutting edge of each tooth 26 (generally designed at 36) is formed as two generally straight portions 38 and 40. Cutting edge portion 38, referred to as the primary cutting edge, is formed by the intersection of the primary rake surface 28 with the primary back off surface 32. Cutting edge portion 40, referred to as the secondary cutting edge, is formed by the intersection of secondary rake surface 30 and secondary back off surface 34. It will be observed from FIG. 2 that in a radial direction back off surface 32 inclines downwardly and outwardly and back off surface 34 inclines downwardly and inwardly. These two back off surfaces intersect along a line 42 (FIG. 7) which at the cutting edge 36 defines a low point 44 on each cutting edge 36.

Primary rake surface 28 has a relatively high rake angle $a$ whereas secondary rake surface 30 has a relatively low rake angle $b$. Generally speaking, rake angle $a$ is preferably in excess of about 20° whereas rake angle $b$ is preferably not more than about 10°. Primary back off surface 32 has a back off angle $c$ and secondary back off surface 34 has a back off angle $d$. Back off angle $c$ lies within the range of about 7° to 15° and back off angle $d$ preferably lies within the range of about 12° to 20°. It is desirable that the included angle $e$ adjacent the secondary cutting edge 40 be rather large, preferably at least about 60°. For reasons explained hereinafter, the included angle $f$ adjacent primary cutting edge 38 may be less than included angle $e$.

While the values of the rake and back off angles stated above are not critical, they are typical for hole cutters of the present invention designed specifically for cutting holes in mild steel. These angles can be increased for softer materials and decreased for harder materials. In some instances, even when intended for use in mild steel, the rake and clearance angles of the cutter can be substantially smaller than stated above. In the case of stainless steel the rake angles can approach zero or even be negative. It is important however with respect to this aspect of the invention that the rake angle adjacent the inner periphery of each tooth be greater than the rake angle adjacent the outer periphery of each tooth. If desired, the cutting edge of each tooth can be formed such that the rake angle thereof progressively diminishes in a radially outward direction.

The low point 44 on cutting edge 36 is located within the extent of the secondary rake face 30. Stated differently, rake surface 30 extends radially inwardly of each tooth at least slightly beyond low point 44. In relation to the radial extent of each cutting edge 36, it is preferred to have the secondary rake surface 30 extend across at least about 10 percent but preferably not more than about 40 percent of the tooth width. It is also preferred that the vertical extent of secondary rake surface 30 at the outer edge of the tooth can be at least as great as the depth of cut intended with the tool, for example, at least 0.004 inch and preferably substantially greater.

Figure 6:
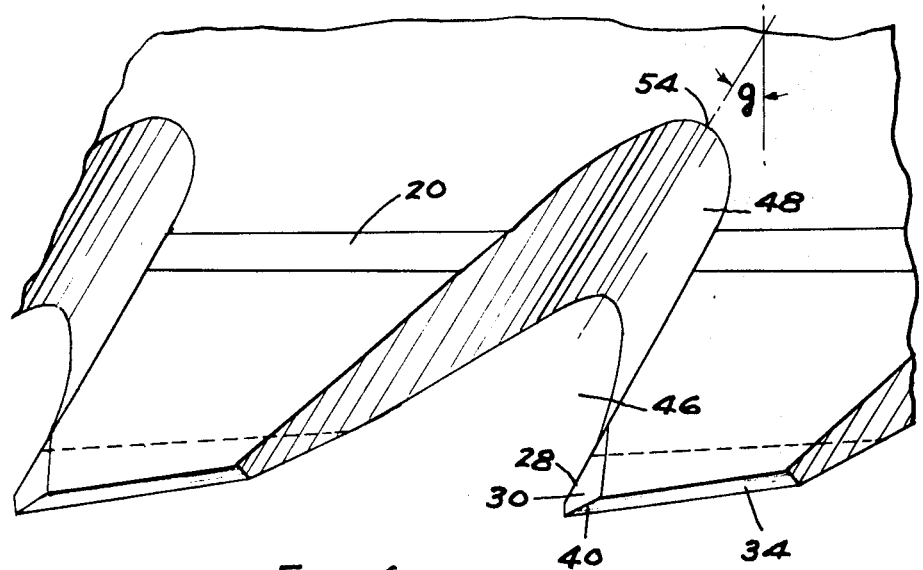
FIG. 6 is a fragmentary side elevational view of a portion of the tool illustrated in FIG. 1 on an enlarged scale.

Each tooth 26 is formed on the thickened portion 18 of sidewall 16. The vertical extent of each tooth at the inner periphery of the sidewall, designated $h$ in FIG. 2, is relatively small so that the teeth preferably terminate below shoulders 20, 22 at their inner ends. The teeth themselves are, therefore, relatively short in an axial direction. The daylight clearance space 46 between successive teeth is therefore of short vertical dimension; for example, 0.020 inch to 0.050 inch. However, the effective clearance space between successive teeth is enlarged by the formation of a gullet 48 between successive teeth around the outer periphery of the blade. As shown in FIGS. 2 and 6, the gullet 48 is inclined to the vertical axis of the tool at an angle $g$ and is formed so that the gullet increases in cross section in a radially outward direction. Gullet 48 is inclined upwardly and outwardly as at 50 and is preferably formed by grinding with an abrasive wheel or the like which is manipulated relative to the tool so that the radially innermost portion 50 of the gullet inclines upwardly and outwardly from a low point 52 on the inner periphery of wall 16 to the outer periphery of sidewall 16 as at 54 and at an angle to the vertical of at least about 10° or more but not more than about 70°. Angle $g$ (that is, the angle of inclination of the gullet from the axis of the tool in a circumferential direction) is not greater than about 30° and in combination with the outward inclination of the gullet promotes a smooth flow of chips from the cutting edges 36 in a direction upwardly and radially outwardly. It will be observed that the upper end portion 54 of gullet 48 is located well above shoulder 20 and that each gullet increases in width in a radially outward direction.

Figure 7:
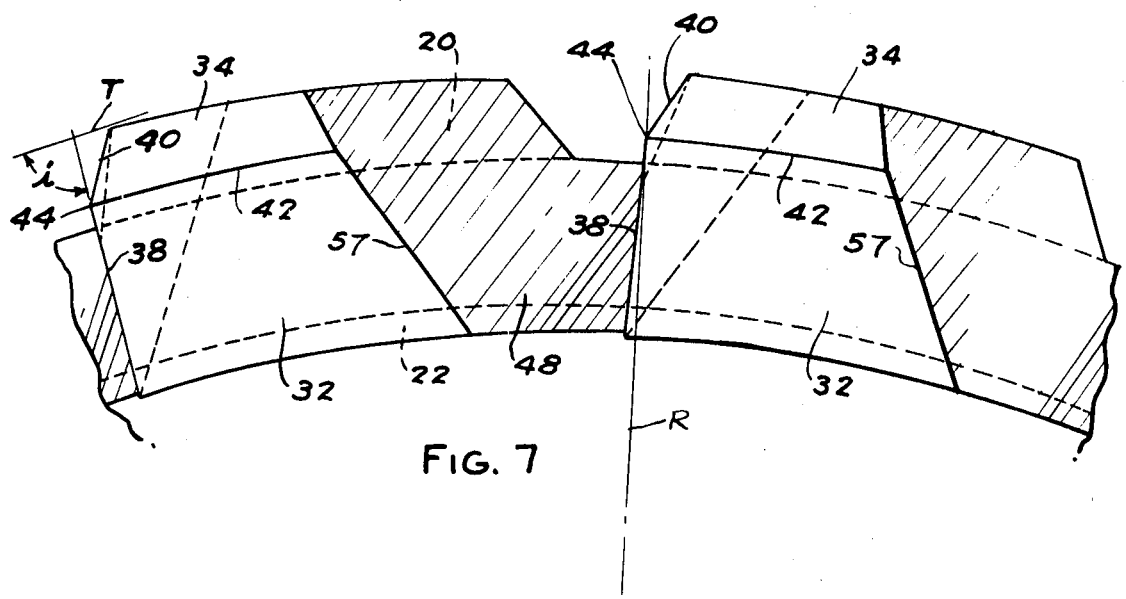
FIG. 7 is a fragmentary end view of the cutter as viewed from the bottom thereof.

It will be appreciated that the vertical dimension $h$ (FIG. 2) is a function of the radial inclination of primary cutting edge 38. The geometry of cutting edge 38 is such that the chip cut thereby is directed upwardly and radially outwardly. This in turn is governed by both the inclination of edge 38 in a radial direction as seen in FIG. 2 and by the location of this edge relative to a radial line R extending from the central axis of the cutter through the low point 44 of the tooth. As shown in FIG. 7, edge 38 is located forwardly of radial line R. Stated differently, edge 38 extends along a line which intersects the tangent line T at an angle $i$ of not more, and preferably less, than 90° on the forward side of each tooth. The extent to which edge 38 inclines downwardly and outwardly (FIG. 2) and the extent to which it is disposed forwardly of radial line R determine the extent to which the chips are directed radially outwardly and upwardly into gullet 48. This is true because edge 38 directs the chip cut by it in path generally perpendicular to the path of travel of edge 38. Thus, as long as edge 38 is forwardly of radial line R the inclination of edge 38 can be even less than illustrated in FIG. 2. On the other hand, the inclination of edge 38 should not be so steep that the included angle between edges 38 and 40 at low point 44 is less than about 120°. In the event that the cutter is used for cutting cylindrical slugs (as distinguished from a primary purpose of cutting holes) then cutting edge 38 can incline upwardly in an outwardly direction provided it is located forwardly of radial line R a very substantial extent.

In order to provide running clearance between each tooth and the material being cut the outer peripheral surface 56 and the inner peripheral surface 58 of each tooth are inclined inwardly toward each other in an upward direction (FIG. 2). In addition, as indicated in FIG. 7, each tooth is of progressively narrower width in a direction from the cutting edge 36 to the trailing edge 57. These running clearances can be as little as a few thousandths of an inch and still eliminate all friction between the teeth and the walls of the hole and slug being cut.

Figure 8:
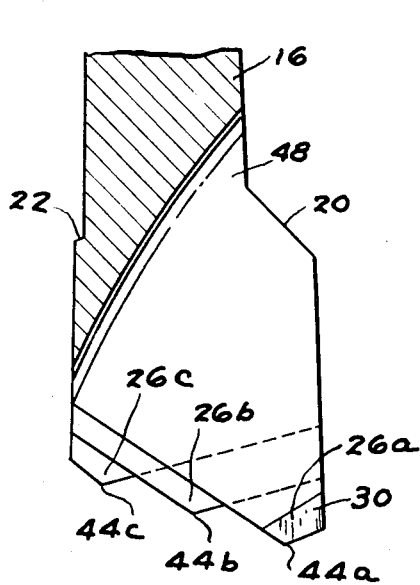
FIG. 8 and 8a are fragmentary sectional views of modified forms of hole cutters of this invention.
Figure 8A:
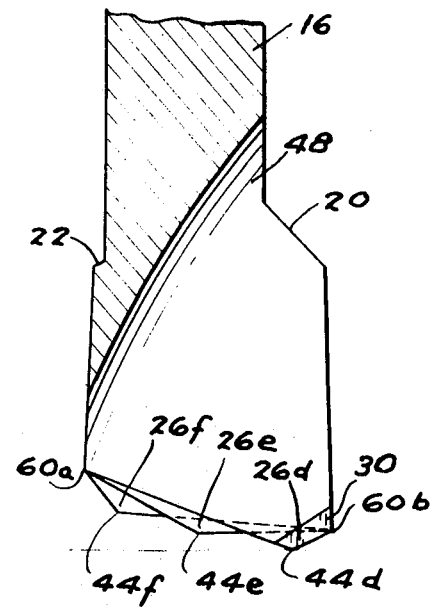
Figure 9:
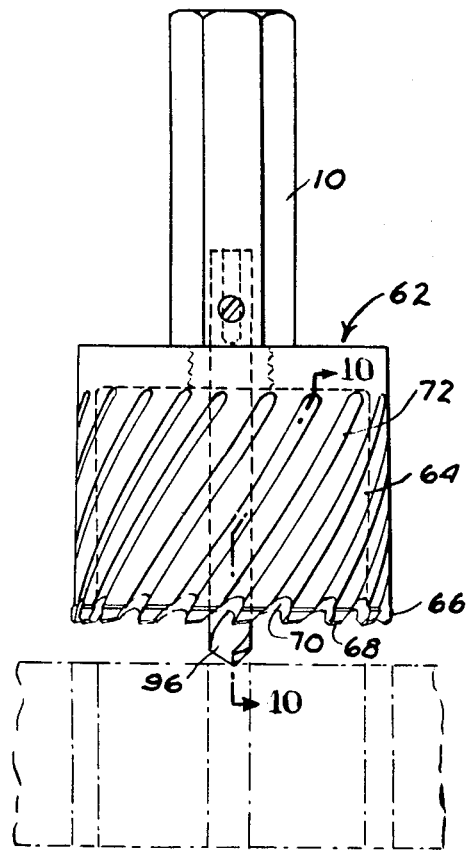
FIG. 9 is a side elevational view of another modified form of hole cutter according to the present invention.

In the embodiments illustrated in FIGS. 8 and 8a the teeth are divided into three successive groups. In FIG. 8 the successive teeth in each group are designated 26a, 26b and 26c. The low points on the successive teeth of each group are staggered readily in a straight line and are designated 44a, 44b and 44c. In the tool shown in FIG. 8a the successive teeth in each group are designated 26d, 26e and 26f and the low points of these teeth are designated 44d, 44e and 44f, respectively. The lower inner and outer edges of the latter teeth are aligned horizontally as indicated at 60a and 60b, respectively. In each of these embodiments only the leading tooth of each group (that is, tooth 26a of the embodiment illustrated in FIG. 8 and tooth 26d of the embodiment illustrated in FIG. 8a) would be provided with the secondary rake surface 30. The remaining two teeth in each group would be formed only with the primary rake surface. With a tool having the teeth arranged as shown in FIG. 8 and 8a wherein the low points are staggered radially of the groove being cut, each tooth (under a normal feed rate) cuts a chip having a width generally about one-third of the total width of the groove being cut by the cutter.

Figure 10:
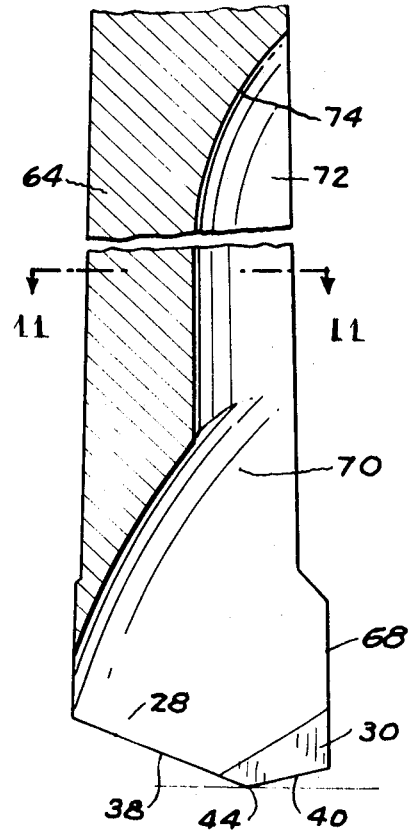
FIG. 10 is a fragmentary sectional view along line 10—10 in FIG. 9.
Figure 11:
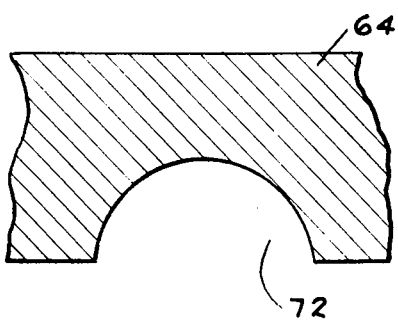
FIG. 11 is a fragmentary sectional view along line 11—11 in FIG. 10.

In FIGS. 9 through 12 there is illustrated a tool specifically adapted for cutting relatively deep holes, for example, holes deeper than 1 inch. The tool illustrated in these figures likewise includes an arbor 10 with a cup 62 mounted on the lower end thereof. Cup 62 has a vertical extent substantially greater than cup 12. The sidewall 64 of cup 62 is thickened at its lower edge as at 66, the thickened end 66 being formed with cutting teeth 68 which are the same as cutting teeth 26 described above. Between each tooth 68 a gullet 70 is formed which is similar to gullet 48. However, an upwardly extending spiral groove 72 is formed in sidewall 64 as a vertical extension of each gullet 70. Grooves 72 terminate adjacent the upper end of cup 62 in outwardly curved surfaces 74 (FIG. 10). As shown in FIG. 11, each groove 72 is of curved shape in horizontal section so that it is of progressively increasing width in a radially outward direction. In other respects the tool shown in FIGS. 9 through 12 is substantially the same as that illustrated in FIGS. 1 through 7.

Figure 14:
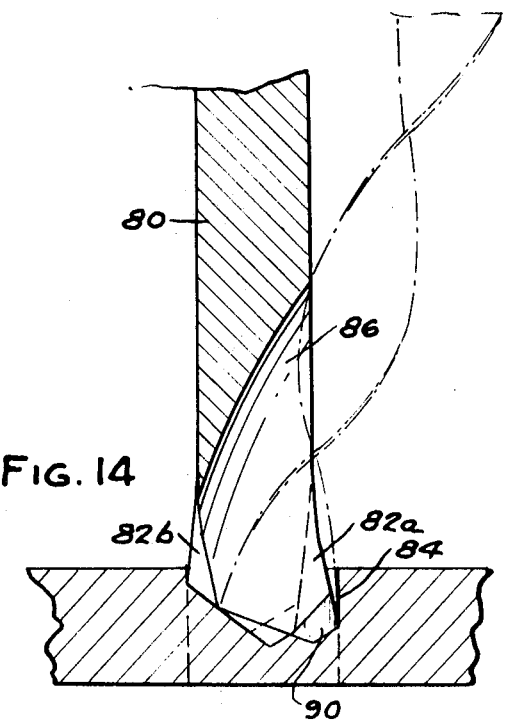
FIG. 14 is a fragmentary sectional view along line 14—14 in FIG. 13.
Figure 16:
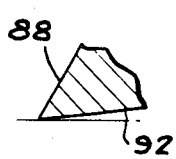
FIG. 16 is a sectional view along line 16—16 in FIG. 15.
Figure 17:
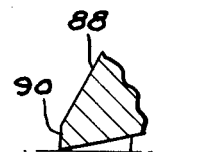
FIG. 17 is a sectional view along line 17—17 in FIG. 15.
Figure 15:
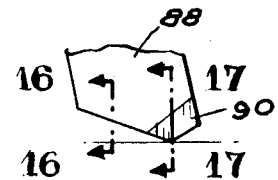
FIG. 15 is a fragmentary view on an enlarged scale of a portion of the cutter illustrated in FIG. 14.
Figure 18:
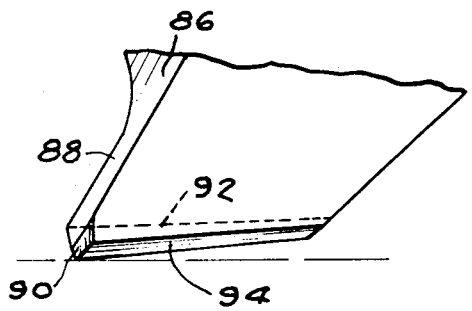
FIG. 18 is a fragmentary view on an enlarged scale of a portion of the cutter illustrated in FIG. 15.

In FIGS. 13 through 18 there is illustrated a tool which embodies most of the features of the tool shown in FIGS. 1 through 7 but which adapted primarily for cutting holes in thin material such as sheet metal, or in thicker material where sidewall finish of the hole is not important. This tool has an arbor 76 to the lower end of which is secured a shallow sheet metal cup 78. Within cup 78 there is press fitted or otherwise secured a cylindrical blade 80. At its lower end blade 80 is formed with a plurality of cutting teeth 82. Teeth 82, insofar as their rake and back off angles are concerned, are generally the same as teeth 26 of the embodiment illustrated in FIGS. 1 through 7. However, as distinguished from the tool shown in FIGS. 1 through 7, blade 80 is not thickened at its lower end. In order to obtain a reasonable amount of chip clearance, successive teeth are set inwardly and outwardly. Thus, as shown in FIG. 14, tooth 82a, is set radially outwardly and the next successive tooth 82b is set radially inwardly. Thus, the groove 84 cut by the tool is somewhat wider than the thickness of blade 80. As in the previous embodiments illustrated, an upwardly inclined gullet 86 is formed between successive teeth. Regardless of whether a tooth 82 is set inwardly or outwardly, each tooth has a primary rake face 88, a secondary rake face 90, a primary back off face 92 and a secondary back off face 94 that are shaped and disposed similar to the corresponding faces of the tool illustrated in FIGS. 1 through 7.

Although in the embodiment illustrated in FIGS. 1 through 7 wall 16 is formed integral with the top wall of cup 12, it will be appreciated that this is not essential. Wall 16 can be formed as a separate high speed steel blade and press-fitted or otherwise retained in a relatively shallow cup similar to cup 78 in FIG. 13. The blade or annular wall of the tool may be formed from tubing or may be rolled from strip stock into a cylindrical shell so as to reduce the cost of the tool as compared with machining the cup or the cup and the shank from solid bar stock.

It will also be appreciated that when cutting holes in most metals the use of coolant is essential. In the case of the cutter of this invention it is preferred that coolant, when employed, be directed against the cutting teeth from within the cup or blade. While no means are illustrated for directing coolant within the cup, it will be appreciated that any of the conventionally used arrangements, such as coolant passageway down through the arbor of the tool, may be utilized for this purpose. In the case of the cutters shown in FIGS. 8 and 8a the coolant will naturally flow into close proximity with all the cutting edges. In any event, since the cutting edges of all the tools disclosed are designed to direct chips radially outwardly and upwardly, the coolant will follow the natural path of travel of the chips.

In order to appreciate the significance and the relationship of the novel features of the whole cutter described above as they relate to satisfying the aforementioned objects of this invention it is desirable to consider each feature as it relates to hole cutting process. The whole cutting process consists of three separate and distinct phases, each phase imposing its limitations on certain desirable tooth configurations. The three phases of the hole-cutting process can be designated:

(1) cut initiation;
(2) material removal; and
(3) cutter breakthrough.

The initiation phase phase is where the cutting edges must penetrate into the workpiece surface. It is at this phase in the whole cutting process where cutting edge failure due to wear or excessive axial loading is most prevalent since it is at this phase where the maximum tool feed load is applied. This condition is aggravated where the surface of the workpiece is rough, abrasive and not truly perpendicular to the direction of the feed. The most important functions of any hole cutter during the cut initiation phase are to penetrate the surface of the workpiece, initiate the cutting process with a minimum amount of relative motion occuring between the cutting edges and the workpiece, and to start the cut with a minimum of hole mislocation. The tool described herein accomplishes these functions admirably.

The tooth configuration of the cutter of this invention allows the cut initiation phase to be accomplished with exceptional rapidity because of the very small area of contact of cutting edge 36 in relation to workpiece. It will be observed that the low point 44 of each cutting edge 36 initially contacts the work. This small contact area allows a large stress to be generated within the workpiece with a relatively low total feed load. However, the unit feed load during this phase of the hole cutting process should be large in order to promote penetration of the tooth into the work. The tool of the present invention is capable of withstanding this high initial unit load because the secondary rake face 30 is at a relatively low angle so that the portion of the tooth initially contacting the work has substantial mass directly adjacent the area initially contacting the work and, therefore, has sufficient strength to withstand the axial loading applied to the tooth. As pointed out above, the included angle $e$ at the cutting edge 40 along the secondary rake surface 30 is relatively large. The portion of each tooth which initially penetrates the work is therefore very strong.

Once the shear failure action is initiated in the material being cut, each tooth begins to penetrate deeper into the workpiece until the full width of the tooth is engaged in the material removal phase of the hole cutting process. As soon as each tooth penetrates to the extent indicated in FIG. 5 the relatively large rake angle $a$ of primary rake face 28 tends to pull the cutting tooth downward into the workpiece thereby reducing the feed load required once the surface of the workpiece has been stressed to the point of cut initiation. Another advantage of providing the low secondary rake angle $b$ is the ability to increase the secondary back off angle $d$ so as to decrease the cutting edge area which initiates the cut while still maintaining a relatively large included angle $e$ which not only imparts strength to the tooth but also provides a large mass directly at the cutting edge to assist in heat dissipation.

The small rake angle $b$ in combination with the relatively large included angle $e$ is of particular importance when the cutter is used in a hand-held drill. Since it is impossible to hold a hand-held drill rigidly and feed it in a true axial direction during either cut initiation or material removal, it follows that the teeth have their cutting cycle constantly interrupted. They are, thus, subjected to repeated high impact forces and tend to dig into the sidewall of the hole being cut. The lower outer corners of the teeth are therefore very vulnerable to chipping. Experience has shown that the provision of the secondary rake surface 30 with its low rake angle eliminates entirely this troublesome problem of tooth chipping.

Figures 3, 4, 5:
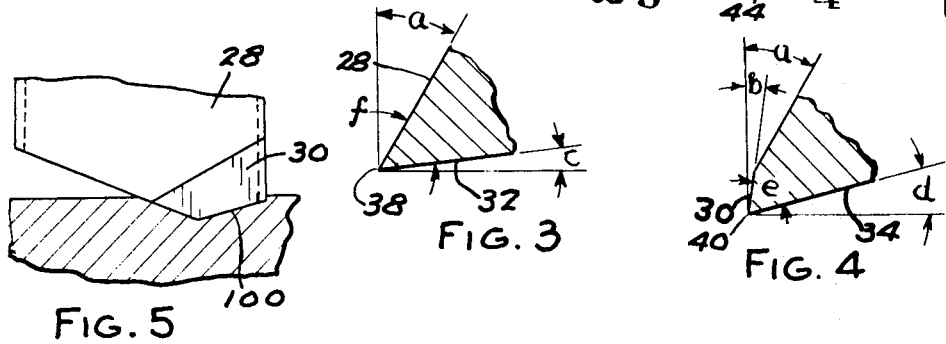
FIG. 3 is a fragmentary sectional view along line 3—3 in FIG. 2.
FIG. 4 is a fragmentary sectional view along line 4—4 in FIG. 2.
FIG. 5 is a fragmentary view illustrating the manner in which initiation of the cut is effected with a hole cutter of the present invention.

The location of the low point 44 on each tooth intermediate the inner and outer edges of the tooth provides for proper location of the cutter, thereby reducing hole locations error to a minimum. While the cutter is preferably provided with a central pilot member, such as the pilot drill 96 illustrated in FIGS. 1 and 9 or the piercing point 98 shown in FIG. 13, nevertheless there is a tendency for any hole cutter to shift off center as the cut is initiated. With the tool of the present invention the low point 44 on each tooth initially contacts the work and cuts a very small narrow groove 100 in the workpiece in the form of a V. As the teeth penetrate further into the work the V-shaped groove 100 becomes progressively wider. However, as soon as the teeth have penetrated into the work a depth of say 0.005 inch sufficient cutting action will have occurred to overcome any radial forces on the teeth which would tend to shift the tool radially and the outside diameter of the hole being cut will have been accurately established as shown in FIG. 5.

When the tool has advanced to a point where the teeth are cutting across their full width the material removal phase of the hole cutting process begins. During this phase of the process both the primary cutting edge 38 and the secondary cutting edge 40 are removing material so that the groove 100 now has a width corresponding to the full width of each tooth at the lower end thereof. Thus during the material removal phase of the process both the primary rake surface 28 and the secondary rake surface 30 are influencing the workpiece chip 102 which is being cut. In view of the fact that the primary rake surface has a radial extent substantially greater than that of the secondary rake surface 30 it follows that the cutting action and the chip being cut will be influenced ro a greater extent by the primary rake surface 28 rather than the secondary rake surface 30. A large rake angle during this phase of the work cutting process is very desirable. It produces a thin ductile chip which does not tend to curl excessively. The chip 102 formed by the primary cutting edge 38 in combination with the primary rake surface has a generally straight continuous configuration and is of sufficient strength to flow smoothly upwardly and outwardly in gullet 48 without curling or breaking.

In this connection it will be noted that as the chip is formed it is immediately directed upwardly and outwardly by gullet 48. Since the chip does not encounter any abrupt blocking surface which would cause it to bend sharply, it forms as a long continuous chip as distinguished from a plurality of small chips which would have to be forced upwardly and outwardly by the chips being cut below. Gullet 48 tends to flatten and turn the chip so that it passes freely upwardly and through the clearance space 104 above shoulder 20. Experience has shown that by designing the cutting edges so that the chips are directed outwardly and causing gullets 48 to direct them upwardly as continuous ribbons into clearance space 104, holes substantially deeper than the gullets can be easily cut. After the chip emerges from the top of the hole being cut it can be broken into short lengths by any suitable positioned chip breaker located at the surface of the material being cut.

The chips are cut relatively strong because they are of V-shape in cross section. This results from the shape of cutting edge 36. This is particularly true of the narrower chips formed by the tools illustrated in FIGS. 8 and 8a.

The high rake angle of surface 28 enables the use of a low feed and driving force. The reduction in feed and driving force requirements reduce tool deflection and improve machining accuracy. While the secondary cutting edge 40 tends to produce a thicker chip which has a tendency to curl, the greater radial extent of the primary cutting edge 38 dominates the chip formation and cutting action and thus promotes the production of a smooth continuous chip which is directed upwardly in gullet 48 into the clearance space 104 between the outer periphery of sidewall 16 and the outer wall of the groove being machined.

As pointed out above, the relatively large primary rake angle $a$ on each tooth reduces the feed and driving force requirements on the tool. This enables cutting holes with lighter machines and less fixturing. Since the cutter of this invention is shaped as a relatively thin-walled cylinder having an open end, its inherent stiffness is relatively low. However, deflections resulting in machining inaccuracies are minimized since the feed and driving loads can be relatively low because of the large primary rake angle. This factor alone contributes very significantly to the life of the cutting edges and the speed and ease with which the tool advances into the work.

Figure 12:
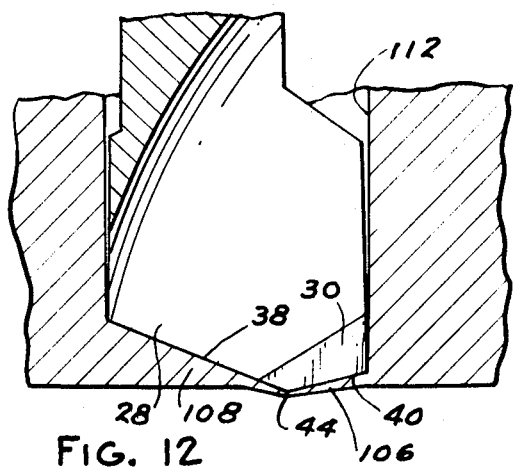
FIG. 12 is a fragmentary sectional view showing the cutter of the present invention as it is about to break through the bottom of the material in which the hole is being cut.
Figure 13:
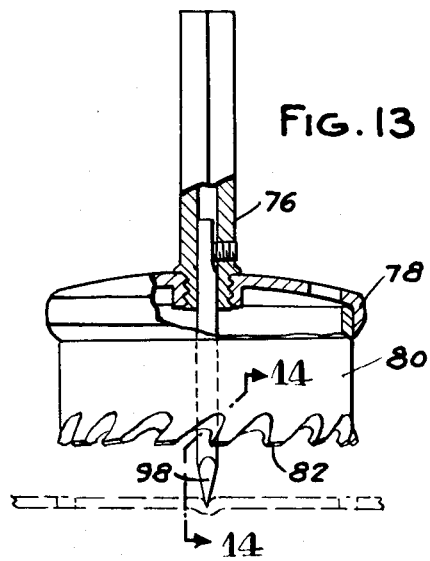
FIG. 13 is a side elevational view, partly in section, of another form of cutter according to the present invention.

The third and final phase of the hole cutting process occurs when the cutter breaks through the workpiece being cut. With conventional hole cutting tools this phase of the process is extremely detrimental to the cutting edges and to the finished hole accuracy. Machining inaccuracies and tool breakage with conventionally formed hole cutters is common at this phase of the process because of of the very severe impact loading on the tooth resulting from the grabbing action when it breaks through the workpiece. With the hole cutter of the present invention this problem is entirely eliminated. As shown in FIG. 12, as the teeth approach the breakthrough point only a small area (designated 106) of the workpiece material is subjected to deflection. The larger area 108 of workpiece material below the primary cutting edge 38 is relatively thick and thus relatively strong. The radial inclination of the primary cutting edge 38 in combination with the relatively low rake angle of the secondary rake face 30 prevents the teeth from breaking through the material abruptly so as to result in a grabbing action. The material in area 106 is therefore machined off smoothly with very little bending. Consequently no binding or tooth impacting will occur. As soon as the area 106 is machined off, the central slug 110 is separated from the workpiece and the sidewall 112 of the hole being cut is machined smoothly by the secondary cutting edge 40. The low feed pressure required not only greatly minimizes the grabbing tendency on breakthrough but also minimizes the burr formed with the conventional cutters which require relatively high feed pressures.

In any hole cutting operation the ability to remove the chip being cut away from the cutting edge area is of prime importance in the three phases of the hole cutting process described. If the chips are not removed from the cutting edge area, congestion between the cutting edges and the workpiece and in the surrounding area will not only cause interference with the hole cutting process by creating excessive frictional heat buildup but will also result in cutting edge abrasion and damage to the side wall of the hole being cut. With the tool of the present invention the chip being cut is continuous, straight and relatively strong. As pointed out previously the chip is guided upwardly along the primary rake surface 28 by reason of the high rake angle of surface 28. In addition, it is directed in a radially outward direction by the radial inclination and forward location of primary cutting edge 38. Thus there will be no tendency for the chip to wedge between the inner wall 100 of the groove being cut and the inner wall of the tool. This is enhanced by the relatively short dimension $h$. Furthermore, with the tool of the present invention (particularly the embodiments illustrated in FIG. 1 through 12) the thickened edge of wall 16 sidewall imparts rigidity to the teeth but also provides the clearance space 104 for the ejection of chips. This smooth chip flow is also promoted by previously, configuration and inclination of the gullet 48 which, as pointed out above, opens into the clearance area 104. As shown in FIGS. 2, holes can be cut to a depth where the upper end of gullet 48 is below the top surface of the material being cut, the clearance space 104 providing an escape passageway for chips which become progressively wider in an outward direction.

The provision of a thickened edge 18 at the lower end of the cutter sidewall has a further advantage in that each tooth is enabled to cut along its full width. The wear at the radially inner and outer corners of the teeth is equalized for all teeth. For example, while excellent results are obtainable with a tool such as shown in FIGS. 13 through 18, in sheet metal it will be observed that the outer corner of the inset teeth 82b are subjected to little wear while the outer corners of the outwardly set teeth 82a (the corners that are machining the outer wall of the groove) are subjected to considerable wear. Thus, some of the teeth are subjected to excessive wear at the outer corners and other teeth are subjected to excessive wear at their inner corners. Where the teeth are formed as shown in FIGS. 1 through 12 so that all are permitted to cut across their full width, the outer corner of every tooth assists in machining the outer wall of the groove and the inner corner of every tooth assists in machining the inner wall of the groove. It naturally follows that if all the teeth are subjected to equal wear the life of the tool is prolonged. It also follows that if all of the lower outside corners of the teeth are assisting in machining the outer wall of the groove being formed a smoother and more accurate finish will be obtained in the hole being cut. In addition, where some teeth are set inwardly and others are set outwardly the inner lower corners of the outwardly set teeth and the outer lower corners of the inwardly set teeth have no clearance downwardly or behind them.

The configuration of cutting edges 36 in combination with the rake and back off described and the relatively large mass of each tooth directly adjacent its cutting edge promote heat dissipation and smooth flow of chips away from the cutting edges. This in turn enables more closely spaced teeth which is desirable from the standpoint of heavier cuts, longer tool life and less tendency to grab in thin materials and with hand-held drills.

The embodiments illustrated in FIGS. 8 and 8a are particularly adapted for use with lighter, low torque machines. As pointed out previously, with these tooth configurations each tooth under a normal feed rate cuts a chip which approximates only one-third of the total width of the groove being machined. Thus, the chips formed are much smaller and much more readily discharged. In addition, each tooth is subject to approximately one-third of the stress that it would otherwise be subjected to if it were cutting along its full width. Each tooth has substantial mass for excellent heat dissipation and, since only about one-third the width of each cutting tooth is actually cutting, coolant can be directed immediately adjacent each of the cutting edges. In the embodiment illustrated in FIG. 8 it is preferred that each tooth have the same width across its cutting edge so that the inner and outer corners of all teeth are subjected to uniform wear and also assist in cutting the inner and outer surfaces of the groove being formed, as is the case with the cutter shown in FIG. 8a. In addition, since each tooth is cutting across only approximately one-third of its width, these types of cutters function extremely well in machines where, because of the impossibility to obtain absolute accuracy or because of a slightly bent quill, certain teeth are subject to excessive wear and impacts.

Tests have shown that where a tool such as shown in FIG. 14 is used for cutting relatively deep holes the tendency for scoring the sidewall of the hole because of the lack of sufficient chip clearance is substantially reduced and frequently eliminated where a coolant is used in the cutting operation. The coolant (which may be any of the standard cutting fluids employed) imparts a lubricating quality to the chips which overcomes to a large extent the binding effect which otherwise results.

I claim:

1. A rotary hole cutter having a generally cylindrical annular wall provided with a plurality of axially extending cutting teeth spaced around the lower end thereof, the axial extent of said cutting teeth being substantially less than the axial extent of said wall, said cutting teeth having a generally radially extending cutting edge at the lower end thereof defined by the intersection of a front rake face and a bottom back off face, the rake angle of said front rake face being greater adjacent the radially inner end of said cutting edge than adjacent the radially outer end of said cutting edge.

2. A rotary hole cutter as called for in claim 1 wherein said cutting edge is defined by two generally straight portions comprising a radially inner portion which inclines downwardly and radially outwardly and a radially outer portion which inclines downwardly and radially inwardly.

3. A rotary hole cutter as called for in claim 1 wherein the rake angle of said front rake face adjacent the radially inner end of the cutting edge is at least about 20° and the rake angle of said front rake face adjacent the radially outer end of the cutting edge is not more than about 10°.

4. A rotary hole cutter as called for in claim 1 wherein said front rake face is defined by two radially spaced portions, the radially inner face portion having a generally uniform rake angle and the radially outer face portion having a generally uniform lesser rake angle.

5. A rotary hole cutter as called for in claim 4 wherein the rake angle of said radially inner face portion is at least about 20° and the rake angle of said radially outer face portion is not more than about 10°.

6. A rotary hole cutter as called for in claim 4 wherein the radial extent of the portion of the cutting edge having the greater rake angle is greater than the radial extent of the portion of the cutting edge having the lesser rake angle.

7. A rotary hole cutter as called for in claim 4 wherein said face portion having a greater rake angle has a radial extent adjacent the cutting edge of at least about 60 percent of the width of the tooth in a radial direction.

8. A rotary hole cutter as called for in claim 1 wherein said cutting edges are radially inclined so that the radially inner ends of the cutting edges are disposed in a plane above the radially outer ends of said cutting edges.

9. A rotary hole cutter as called for in claim 4 wherein said cutting edges comprise two portions inclined radially in opposite directions and intersecting at a crest located intermediate the radially opposite ends of the cutting edges.

10. A rotary hole cutter as called for in claim 4 wherein at least some of said cutting edges comprise two radially adjacent portions which are radially inclined in opposite directions and which intersect in a crest which forms a lowermost portion of said cutting edges, said face portion of lesser rake angle extending radially inwardly beyond said crest.

11. A rotary hole cutter as called for in claim 10 wherein said face portion of lesser rake angle intersects said bottom back off face with an included angle of at least about 60° and said face portion of greater rake angle intersects said bottom back off face with an included angle of at least 40°.

12. A rotary hole cutter as called for in claim 11 wherein said back off face comprises two portions which are radially inclined in opposite directions and intersect along a line which is aligned circumferentially with said crest.

13. A rotary hole cutter as called for in claim 1 wherein the cutting edges when viewed in plan extend along lines which intersect the tangent at the outer periphery of the teeth at an angle of not greater than 90° on the forward side of each tooth.

14. A rotary hole cutter as called for in claim 13 wherein said sidewall is formed between successive teeth with an upwardly and radially outwardly extending gullet.

15. A rotary hole cutter as called for in claim 14 wherein said sidewall has a radially thickened lower edge in which said teeth are formed, said gullet extending from within said thickened edge upwardly into the portion of said wall above said thickened lower edge.

16. A rotary hole cutter as called for in claim 1 wherein said sidewall has a plurality of upwardly extending gullets around the outer face thereof, one gullet between each pair of successive teeth, said gullets inclining outwardly in an upward direction from the inner periphery of the wall of the cutter.

17. A rotary hole cutter as called for in claim 16 wherein each of said gullets inclines outwardly relative to the plane of said wall at an angle of not more than about 70°.

18. A rotary hole cutter as called for in claim 16 wherein each gullet is of progressively wider cross section in radially outward direction.

19. A rotary hole cutter having a generally cylindrical annular wall provided with a plurality of axially extending cutting teeth spaced around the lower end thereof, the axial extent of said cutting teeth being substantially less than the axial extent of said wall, said wall having an upwardly extending gullet on the outer side thereof between successive teeth, the successive teeth having a clearance space therebetween and said gullets opening at their lower ends into said clearance spaces, said gullets extending upwardly beyond said teeth and being inclined radially outwardly in an upward direction from adjacent the inner periphery of said wall, said gullets also being inclined circumferentially rearwardly relative to the axis of the cutter, each of said teeth having a generally radially extending cutting edge at the lower end thereof, each of said cutting edges when viewed in plan extending along a line which intersects the tangent line at the outer periphery of the tooth at an angle less than 90° on the forward side of said tooth, the radially innermost portion of each cutting edge being inclined downwardly in a radially outward direction and the radially outermost portion of each cutting edge inclining downward in a radially inward direction.

20. A rotary hole cutter as called for in claim 19 wherein said wall comprises a radially thickened edge, said teeth being formed in said thickened edge with their radially outer ends extending outwardly beyond the portion of the wall above said thickened edge and said gullets extending upwardly beyond said thickened edge.

21. A rotary hole cutter as called for in claim 20 wherein said teeth extend radially outwardly beyond the portion of the wall above said thickened edge a distance equal to at least about 25 percent of the tooth width.

22. A rotary hole cutter as called for in claim 20 wherein the outer surface portion of the wall above said thickened edge inclines radially inwardly in an upward direction.

23. A rotary hole cutter as called for in claim 20 wherein said teeth are progressively thinner in an upward direction and are progressively thinner in a direction from the forward to the trailing edges thereof.

24. A rotary hole cutter having a generally cylindrical annular wall provided with a plurality of axially extending cutting teeth spaced around the lower end thereof, the axial extent of said cutting teeth being substantially less than the axial extent of said wall, said teeth being divided into a plurality of successive groups, the successive teeth in one group corresponding in configuration with the successive teeth in the other groups, the teeth in each group having a generally radially extending cutting edge defined by the intersection of a front rake face and a bottom back off face, the cutting edges of each tooth comprising two radially adjacent portions which are radially inclined relative to one another and intersect at a crest so that each tooth is adapted to cut a generally V-shaped groove, the crests of the teeth in each group being staggered progressively radially and progressively upwardly so that the crest of the lead tooth in each group is located radially outermost and lowermost.

25. A rotary hole cutter as called for in claim 24 wherein said front rake face of the lead tooth in each group comprises two radially adjacent portions, the radially innermost face portion having a rake angle greater than the radially outermost face portion, said face portion of lesser rake extending radially inwardly beyond the crest of said lead tooth.

26. A rotary hole cutter as called for in claim 25 wherein the radially outer ends of all the cutting edges are spaced from the axis of the tool the same radial distance and the radially inner ends of all the cutting edges are spaced from the axis of the tool the same radial distance.

27. A rotary hole cutter as called for in claim 26 wherein the radially outer ends of all the teeth lie in substantially the same horizontal plane and the radially inner ends of all the teeth lie in substantially the same horizontal plane.

28. A rotary hole cutter as called for in claim 30 wherein said annular wall has a radially thickened lower edge, said teeth being formed in said thickened edge, the radially inner portion of each cutting edge inclining downwardly and radially outwardly and said wall having around the outer periphery thereof an upwardly and radially outwardly inclined gullet between successive teeth, said gullets terminating at their upper ends in the portion of said wall above said thickened lower edge.

29. A rotary hole cutter as called for in claim 19 wherein the radially inner and outer portions of each cutting edge intersect in a crest which forms the lowermost portion of each cutting edge, the included angle between said cutting edge portions being at least 120°.

PO-1050
(5/69)

UNITED STATES PATENT OFFICE
CERTIFICATE OF CORRECTION

Patent No. 3,609,056      Dated September 28, 1971

Inventor(s) EVERETT D. HOUGEN

It is certified that error appears in the above-identified patent and that said Letters Patent are hereby corrected as shown below:

TITLE PAGE - Line 2    Cancel "6956 N. Odell Ave., Chicago, Ill. 60634" and insert in place thereof -- G-5072 Corunna Road, Flint, Mich. 48504 --

Signed and sealed this 29th day of February 1972.

(SEAL)
Attest:

EDWARD M. FLETCHER, JR.
Attesting Officer

ROBERT GOTTSCHALK
Commissioner of Patents